US005561469A

United States Patent [19]
Schultz

[11] Patent Number: 5,561,469
[45] Date of Patent: Oct. 1, 1996

[54] AUXILIARY VIDEO DATA SLICER WITH MULTI-MODE PEAK DETECTION FOR DETERMINING SYNC AND DATA SLICING LEVELS

[75] Inventor: Mark A. Schultz, Biviers, France

[73] Assignee: Thomson Consumer Electronics, S.A., Courbevoie, France

[21] Appl. No.: 347,323

[22] PCT Filed: May 28, 1993

[86] PCT No.: PCT/US93/05118

§ 371 Date: Nov. 28, 1994

§ 102(e) Date: Nov. 28, 1994

[87] PCT Pub. No.: WO93/26119

PCT Pub. Date: Dec. 23, 1993

[30] Foreign Application Priority Data

Jun. 1, 1992 [EP] European Pat. Off. ............ 92401490

[51] Int. Cl.$^6$ .................................. H04N 7/08
[52] U.S. Cl. .................. 348/476; 348/478; 348/465
[58] Field of Search .................... 348/476, 465, 348/478, 468, 622, 392, 531; 358/142, 147, 148, 146, 153, 174, 337, 319, 320; 375/76, 317, 318, 287; H04N 7/08, 7/087, 7/089, 5/20, 5/04

[56] References Cited

U.S. PATENT DOCUMENTS

| 4,115,811 | 9/1978 | Goff | 358/167 |
|---|---|---|---|
| 4,616,270 | 10/1986 | Nishimoto | 358/320 |
| 4,656,513 | 4/1987 | Langenkamp | 348/622 |
| 4,667,235 | 5/1987 | Nozoe et al. | 358/147 |
| 4,858,007 | 8/1989 | Schweer et al. | 348/465 |
| 5,136,382 | 8/1992 | Meyer | 348/465 |
| 5,249,050 | 9/1993 | Zato | 358/147 |
| 5,371,545 | 12/1994 | Tults | 348/465 |

FOREIGN PATENT DOCUMENTS

| 0022723 | 7/1979 | European Pat. Off. . | |
|---|---|---|---|
| 0320664 | 11/1988 | European Pat. Off. . | |
| 0421897 | 10/1990 | European Pat. Off. . | |
| 62-35789 | 2/1987 | Japan . | |
| 62-224176 | 10/1987 | Japan | H04N 7/167 |
| 63-058667 | 3/1988 | Japan | H04N 5/92 |
| 63-215182 | 7/1988 | Japan . | |

OTHER PUBLICATIONS

Patent Abstracts of Japan, vol. 12, No. 280, Aug. 1988 and Japanese Patent No. 63–058667* (*Listed Above).

IEEE Transactions on Broadcasting, vol. 34, No. 3, Sep. 1988, New York, Sablatash et al "Comparisons and Improvements of Designs of Data Slicers and Clock Synchronization Circuits for Broadcast Teletext Decoders Operating in a Multipath Environmen" pp. 381–397.

15th International TV Symposium, 17 Jun. 1987, Montreux, Schepers et al. "D2–MAC An Integrated multinorm receiver", pp. 181–204.

*Primary Examiner*—John K. Peng
*Assistant Examiner*—Nina M. West
*Attorney, Agent, or Firm*—Joseph S. Tripoli; Peter M. Emanuel; Robert D. Shedd

[57] ABSTRACT

An auxiliary video data slicer for extracting auxiliary video information from a video signal includes a peak detector. The peak detector determines a peak amplitude of horizontal sync pulses that are included in the video signal and a peak amplitude of a run-in-clock (RIC) waveform that is included in an auxiliary information component of the video signal. A variable threshold level for the peak detector is varied in a first range to detect the peak amplitude of the sync pulses. A threshold voltage for detecting the leading edge of sync pulses is derived from the peak amplitude of the sync pulses. The location of the RIC waveform within a video line interval is determined in response to detection of a sync pulse edge. The variable threshold level of the peak detector is varied in a second range to detect the peak amplitude of the RIC signal. A data slicing threshold level for extracting auxiliary video information is derived from the peak value of the RIC signal.

20 Claims, 8 Drawing Sheets

AUXILIARY VIDEO DATA SLICER WITH MULTI-MODE PEAK DETECTION FOR DETERMINING SYNC AND DATA SLICING LEVELS

The present invention relates to detection of information that may be present in a video signal during vertical blanking or overscan intervals. A video signal typically includes vertical display intervals, or fields, having a plurality of horizontal line intervals e.g., 262.5 lines per field in NTSC video systems. The beginning of each vertical and horizontal interval is identified by respective vertical and horizontal sync pulses that are included in a composite video signal. During a portion of each vertical interval, information in the video signal may not be intended for display. For example, a vertical blanking interval spans approximately the first 20 horizontal line intervals in each field. In addition, several line intervals adjacent to the vertical blanking period, e.g. line 21, may be within an overscan region of a video display and will not be visible.

The lack of displayed image information during blanking and overscan intervals makes it possible to insert an auxiliary information component, e.g. teletext or closed caption data, into these intervals. Standards such as Federal Communications Commissions (FCC) Regulations define the format for each type of auxiliary information including the positioning of the information within a vertical interval. For example, the present closed captioning standard (see e.g. 47 CFR §§15.119 and 73.682) specifies that digital data corresponding to ASCII characters for closed captioning must be in line 21 of field 1.

The first step in extracting auxiliary video information is to locate the auxiliary information. Various approaches may be used depending on the type of information involved. For example, recognition of teletext data characteristics such as the framing code pattern is a method of locating teletext data. Closed caption information in line 21 may be located by counting video lines, e.g. counting horizontal sync pulses.

After the auxiliary video information is located, the information must be extracted. In the case of digital data, a "data slicer" may be used to convert the video signal into binary data. A data slicer typically operates by comparing the video signal level to a reference level known as the slicing level. For video levels that exceed the slicing level, the comparison produces a logic 1. Video levels that are less than the slicing level produce a logic 0. As an example, closed caption data in line 21 of the video signal may exhibit a signal amplitude range of 0 IRE to 50 IRE. For a signal range of 0 IRE to 50 IRE, a slicing level of 25 IRE would be appropriate.

A constant slicing level may not be adequate for all video signals video signal levels may vary depending on the source of the video signal. Utilizing a constant slicing level with varying video signal levels may bias the extracted data undesirably toward logic 0 or logic 1 resulting in erroneous data extraction. For example, a typical NTSC video signal of 1 V peak-to-peak corresponds to an amplitude range of −40 IRE (sync tip) to 100 IRE (peak video). Under these conditions, the peak 50 IRE and 25 IRE slicing levels associated with an auxiliary video signal correspond to 350 mV and 175 mV respectively. However, if the video signal is 0.5 V peak-to-peak rather than 1 V, the 50 IRE peak of the auxiliary video signal would correspond to approximately 175 mV rather than 350 mV. If the slicing level were fixed at 175 mV for the 1 V peak-to-peak signal, 50 IRE auxiliary video signal levels associated with the 0.5 V peak-to-peak signal would not exceed the slicing level. A logic 1 within the auxiliary video data would never be extracted. Thus, it is desirable to adapt the slicing level to the amplitude of the input video signal.

NTSC video signals typically exhibit a black level at 0 IRE, a negative-going sync pulse peaking at −40 IRE, and a peak picture level of 100 IRE. Although the absolute peak-to-peak amplitude range of typical video signals may not be constant, the ratio in IRE units between peak sync (−40 IRE) and peak picture (100 IRE) of typical signals is constant. If all video signals were typical, determining the amplitude of the sync pulse would provide a 40 IRE reference pulse that could be used to establish the relationship between IRE and absolute signal amplitude for a particular signal. It would then be possible to determine what voltage corresponds to a 25 IRE slicing level. However, certain video signal sources, such as a video cassette recorder (VCR), may not produce video signals exhibiting the NTSC sync to picture ratio of 40:100. Thus, a procedure based on using the sync pulse amplitude to set the slicing level is not reliable for all video signal sources.

The format of an auxiliary information component such as closed caption data includes provisions to facilitate an adaptive slicing level function. As specified in the FCC standards, a closed caption signal in line 21 begins after the "back porch" interval of the video signal with a 7 cycle burst of a 503 kHz sinusoidal reference waveform designated the "run-in clock" (RIC). The RIC reference component of the auxiliary video data signal is followed in the latter half of the line 21 interval by a data signal component that represents the actual closed caption data. The closed caption data standard establishes that the amplitude of the RIC signal is identical to the amplitude of the data signal. Thus, the average of the RIC signal amplitude is an appropriate slicing level for the subsequent data signal.

Establishing an accurate slicing level based on the RIC signal requires accurately locating the RIC signal. Although the above-mentioned line counter approaches will detect a particular line that may contain auxiliary information, the position of the RIC signal within a particular line must be determined precisely. FCC specifications for closed caption data specify that the RIC signal will begin at approximately 10 µs and end at approximately 24 µs after the leading (falling) edge of the horizontal sync pulse for line 21 of field 1. The FCC specification would appear to permit using a fixed delay from the horizontal sync pulse to accurately locate the RIC signal. However, using a delay from the sync pulse edge for the purpose of locating the RIC signal requires precise and reliable detection of the leading edge of the sync pulse.

In addition to an accurate slicing level, a precise indication of the beginning of the video line is also vital to correct extraction of auxiliary video data. In regard to closed caption data, for example, the FCC standard establishes that data will begin at approximately 27.45 us after the leading edge of sync for line 21. If detection of the data does not begin at the correct time after sync, the data at the output of the data slicer may be interpreted incorrectly. For example, the start bit might be misinterpreted or missed altogether. Thus, an accurate slicing level is a necessary but not sufficient condition for correct extraction of auxiliary video data.

Addressing the above-described problems related to auxiliary video data extraction may add substantially to the complexity of the auxiliary video data system. The present trend toward including all video signal processing functions in integrated circuits (IC) limits the available area on an integrated circuit die for additional functions such as auxiliary video data signal processing. The complexity of an auxiliary video data decoder should be minimized to facilitate incorporating the function into an IC.

The present invention resides, in part, in recognition of the above described problems and, in part, in providing an auxiliary video data slicer that estalishes an accurate slicing level independent of video signal amplitude characteristics. In video signal processing systems embodying the invention, an auxiliary video data slicer operates to selectively determine first and second peak amplitude characteristics of the video signal in response to a threshold level. The threshold level is varied in a first range during a first interval including a portion of a horizontal sync pulse to determine the peak amplitude level of the sync pulse. The threshold level is varied in a second range during a second interval including a portion of a run-in-clock (RIC) waveform included in an auxiliary video information signal. A second threshold level having a predetermined relationship to the peak amplitude of the RIC signal is also generated. The video signal is compared to the second threshold level to extract the auxiliary video data.

The invention may be better understood by referring to the drawing in which.

Figure 2:
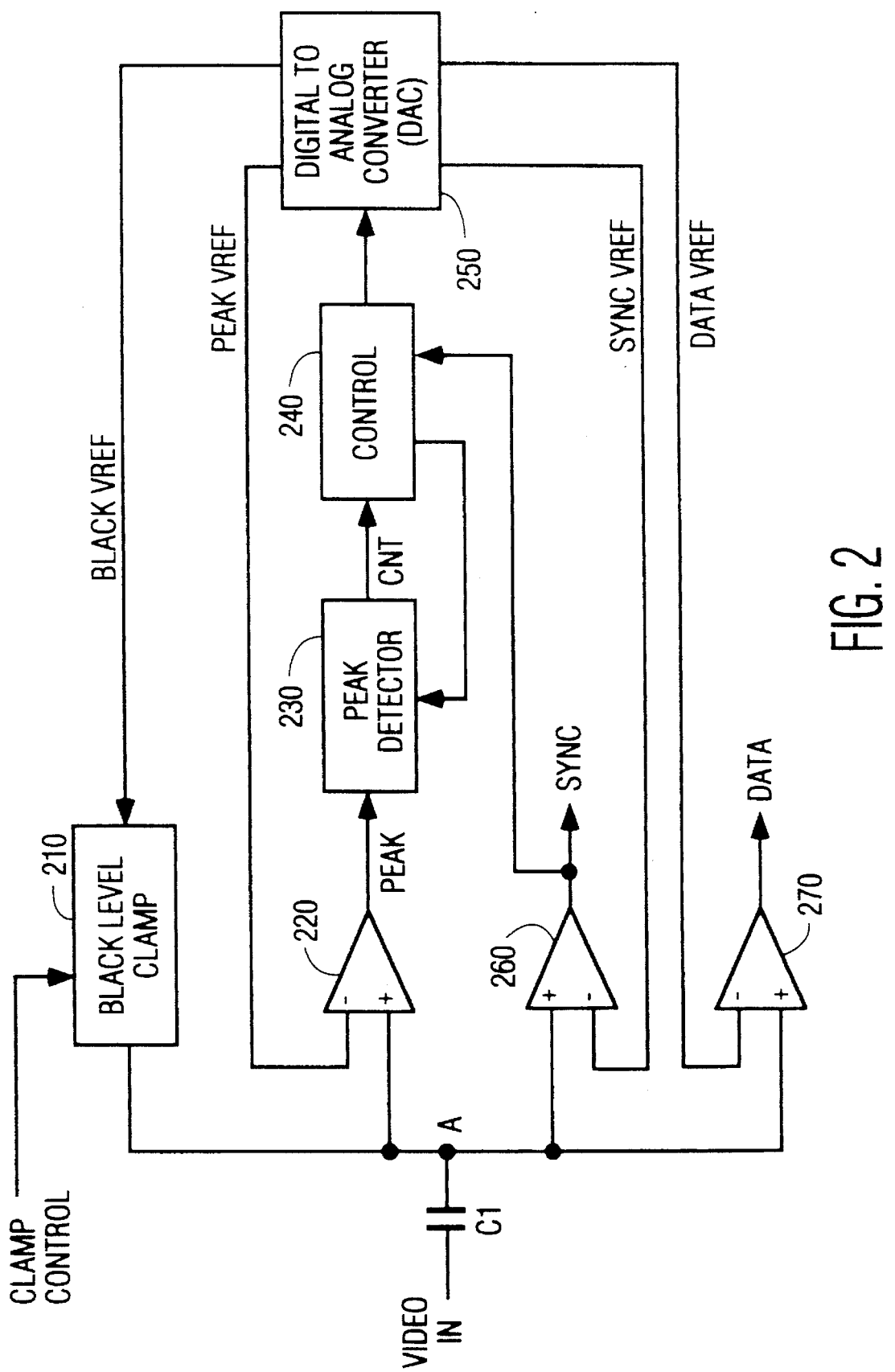
FIG. 2 shows, in block diagram form, a video signal processing system including an embodiment of the invention.
Figure 4:
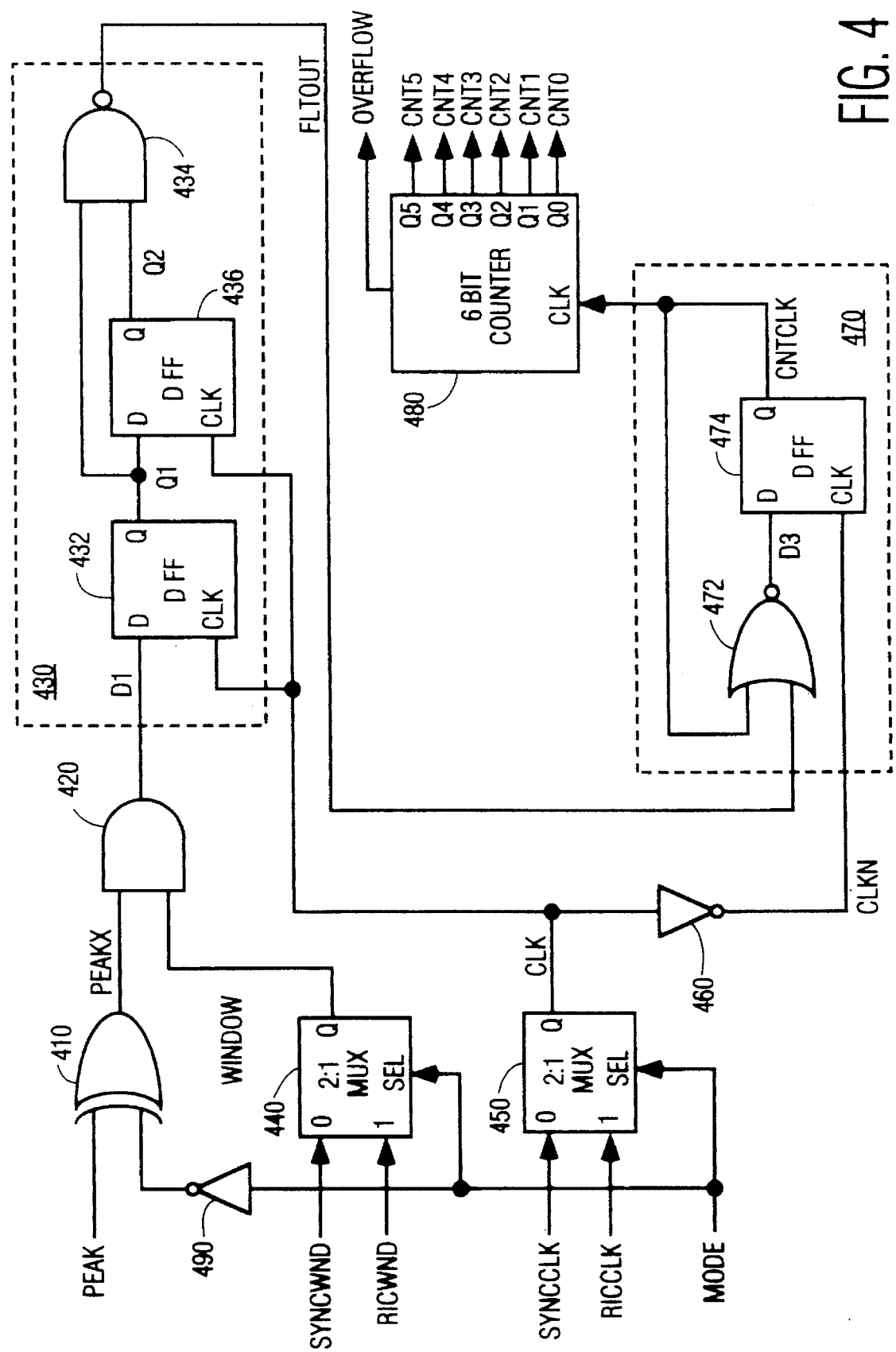
Figure 5:
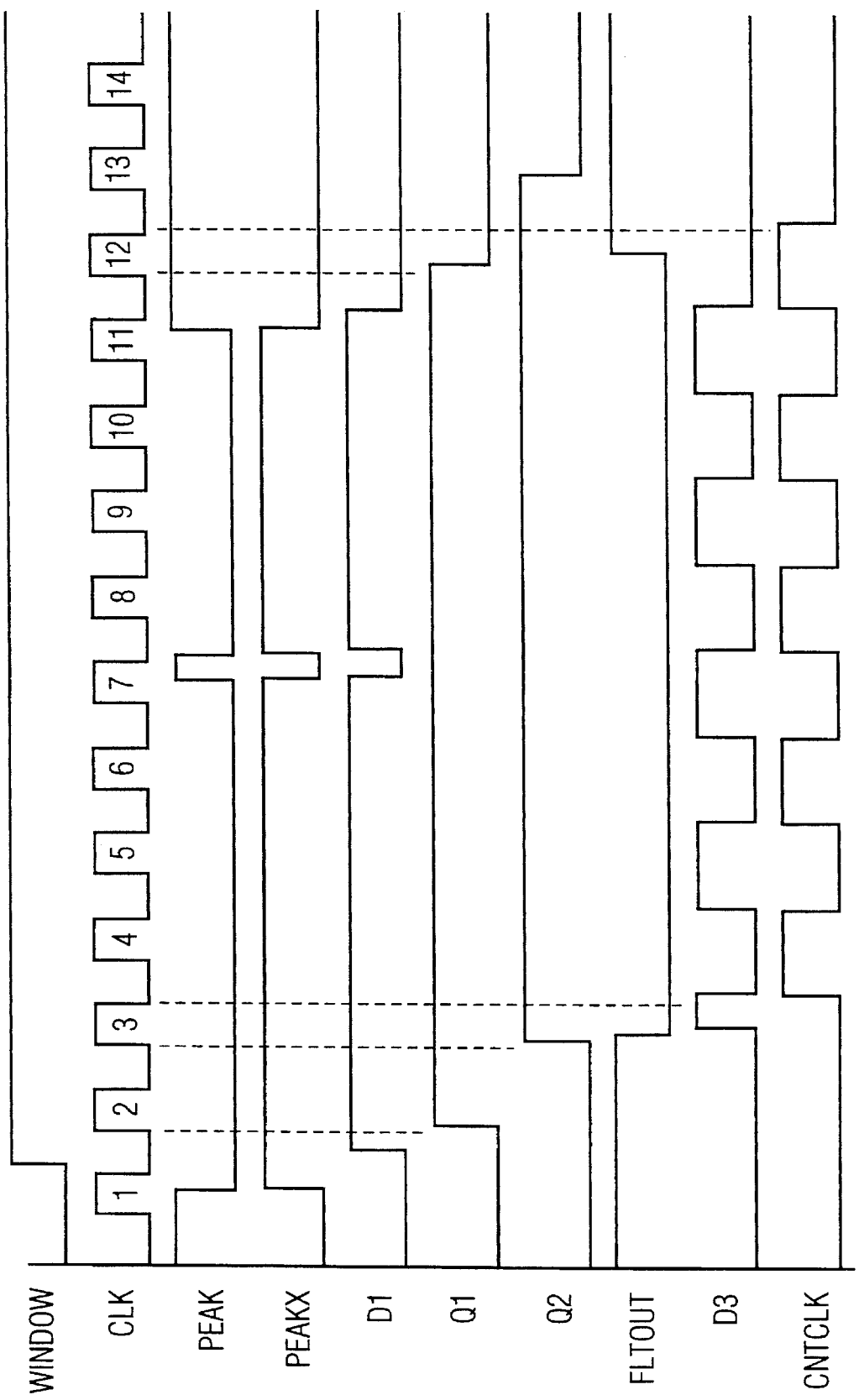
Figure 6:
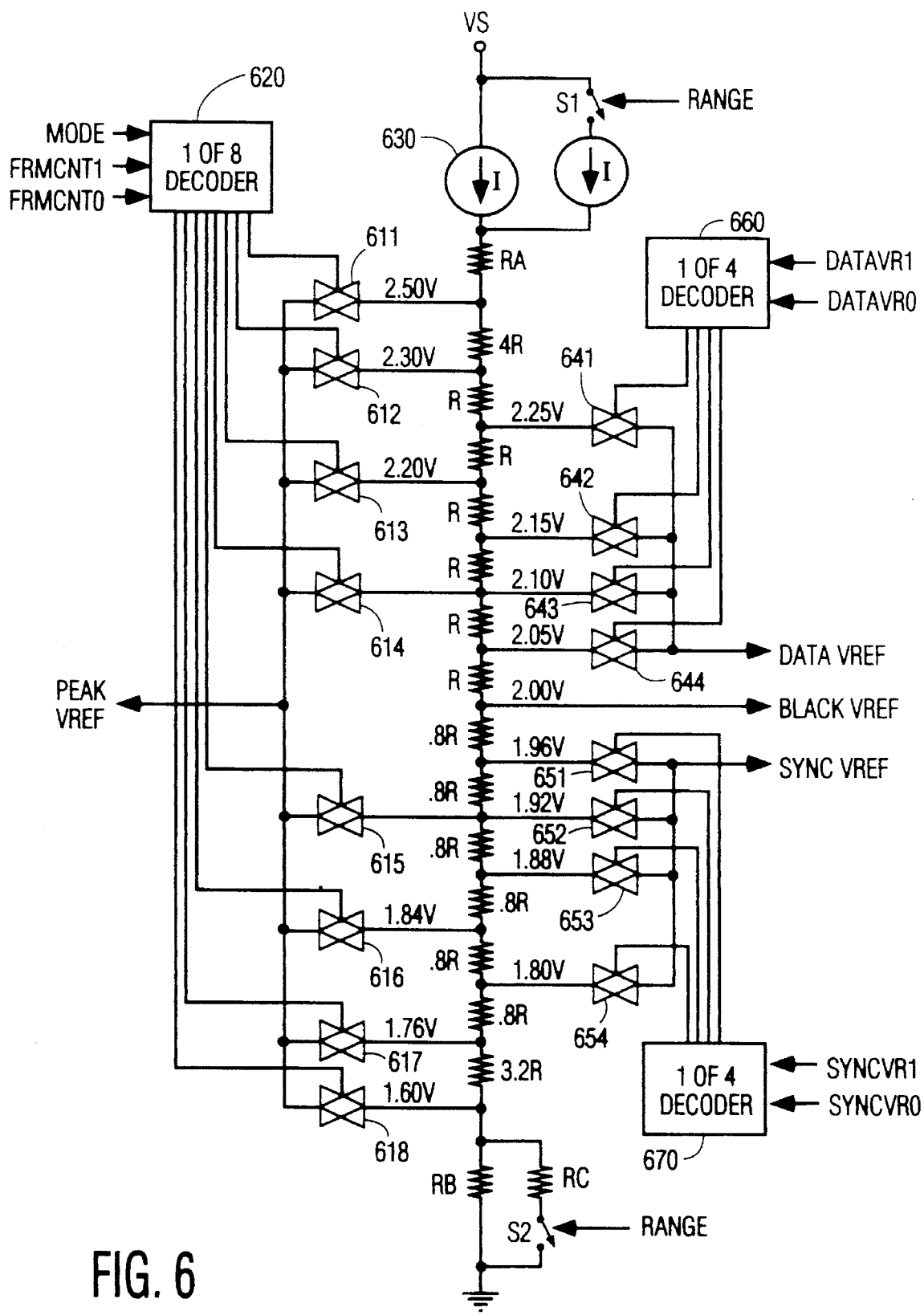
Figure 7:
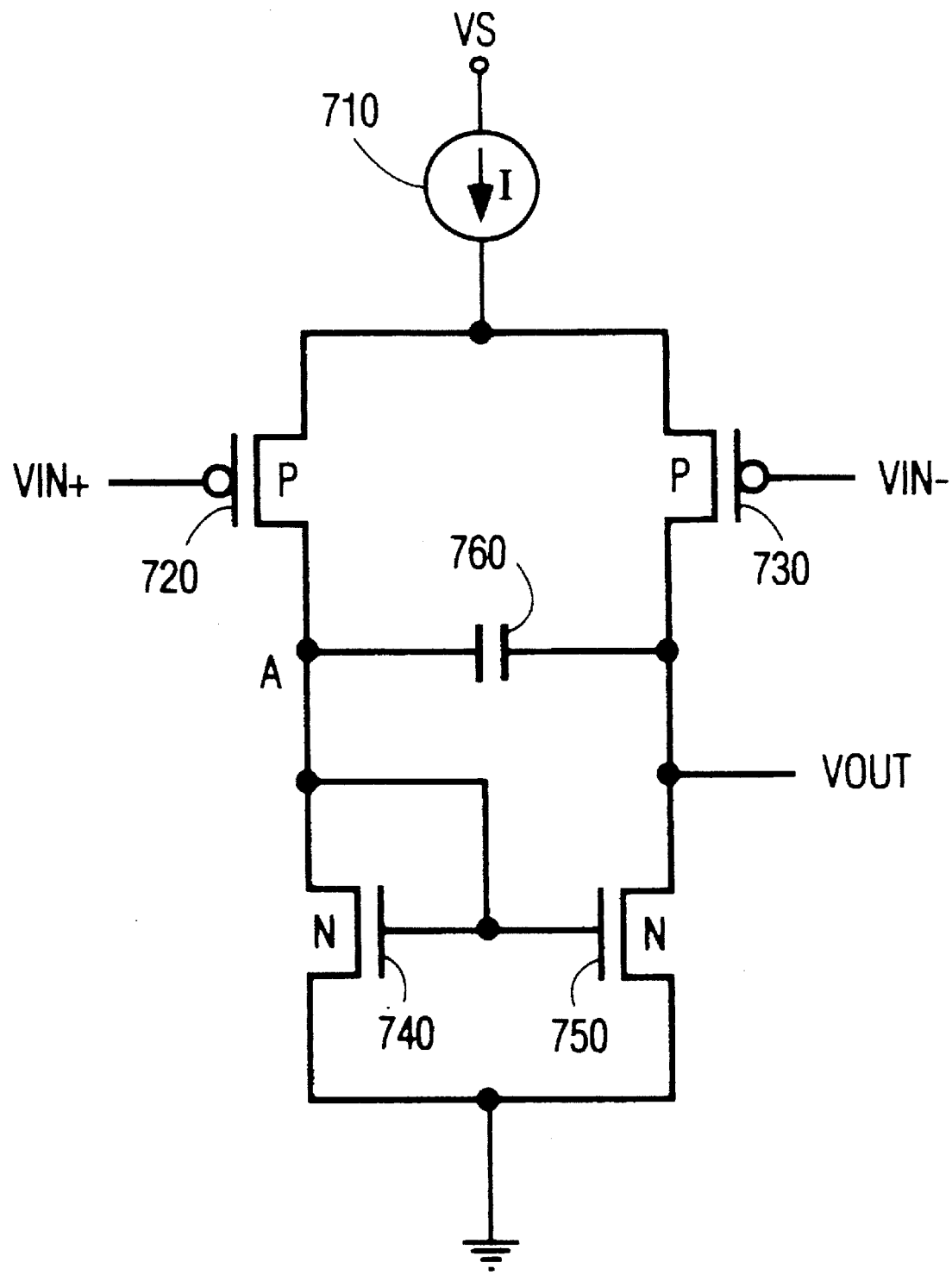

FIGS. 4, 6, and 7 show, partially in schematic form and partially in block diagram form, embodiments of certain functions shown in block diagram form in FIG. 2; and FIG. 5 shows signal waveforms useful for understanding the operation of a peak detector embodiment shown in FIG. 4.

Figure 1:
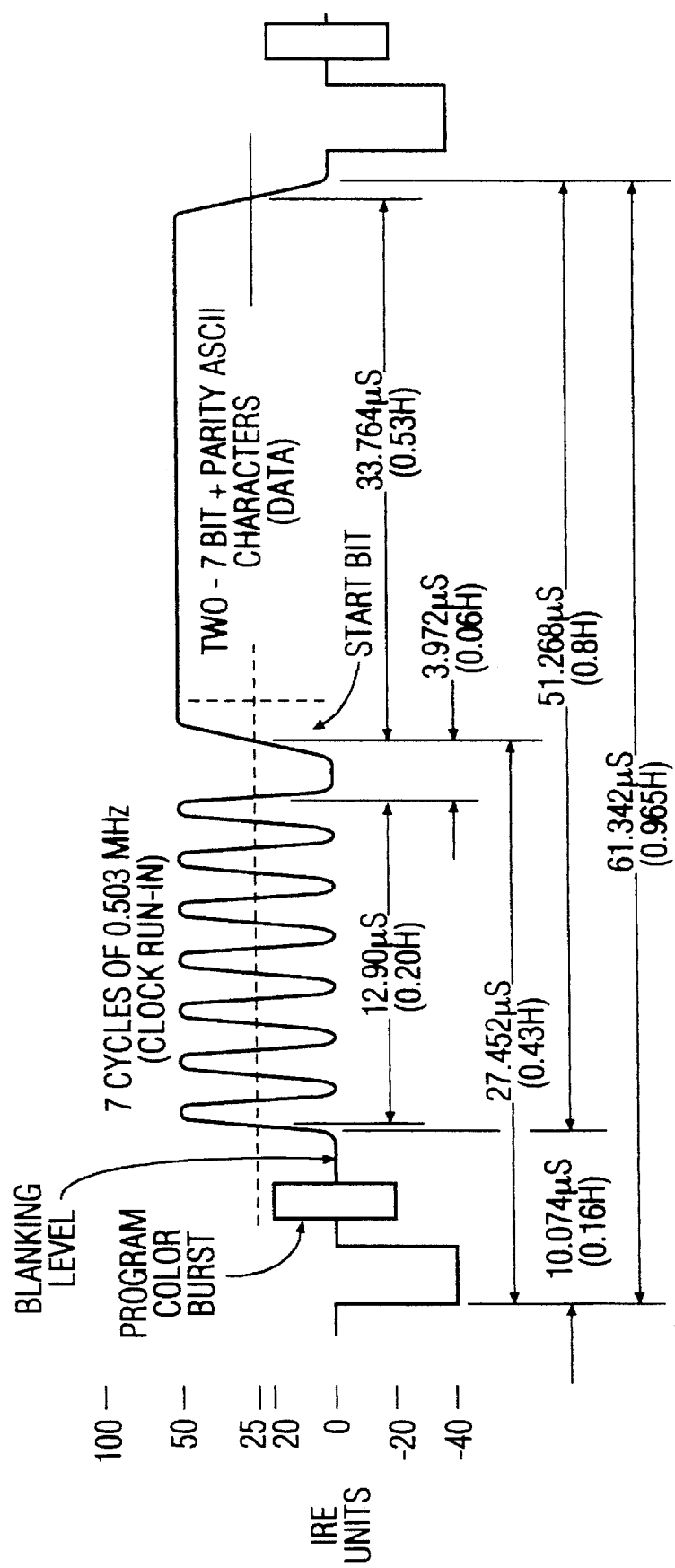
FIG. 1 shows an example of an auxiliary video signal waveform.

The operation of an exemplary embodiment of the invention as shown in FIG. 2 will be explained in the context of closed caption data that complies with the FCC standard closed caption signal depicted in FIG. 1. As discussed further below, the invention may also be applicable to the extraction of other forms of auxiliary video data such as teletext.

In FIG. 2, a composite video signal VIDEO IN is coupled to black level clamp 210 and comparators 220, 260, and 270 via capacitor C1. Black level clamp 210 operates in response to signal CLAMP CONTROL to establish the DC operating level, or black level, of the system. Capacitor C1 acts as an integrator to provide a more stable black level. The result is that the DC level at node A is clamped to reference voltage BLACK VREF from digital to analog converter (DAC) 250 when black level clamp 210 is enabled by signal CLAMP CONTROL. The operation of DAC 250 will be explained in greater detail below. Various forms of black level clamping may be used to implement black level clamp 210. It may be desirable to disable black level clamp 210 via signal CLAMP CONTROL to minimize noise at node A the during peak detection intervals that are described below.

Comparators 260 and 270 generate signals SYNC and DATA in response to the video signal at node A by comparing the video signal to respective reference voltages SYNC VREF and DATA VREF. These reference voltages are supplied by DAC 250 as explained below. Output signal SYNC is a digital signal that indicates when sync pulses occur in the video signal. As described above, a reliable indication of the occurrence of a sync pulse may be used to locate a run-in-clock (RIC) signal. The switching threshold established by reference voltage SYNC VREF must, however, be related to the amplitude of the sync pulses in a known manner to permit relating the beginning of sync pulses as indicated by signal SYNC to the position of the RIC signal.

Comparator 270 operates as a data slicer to convert auxiliary video data, e.g. closed caption data, included in signal VIDEO into a digital data stream identified in FIG. 2 as signal DATA. Logic 0 and logic 1 levels in signal DATA represent levels of signal VIDEO IN that are less than and exceed, respectively, the slicing level. For comparator 270, reference signal DATA VREF determines the slicing level. As described above, accurate extraction of auxiliary video data requires a slicing level that is approximately equal to the average of the RIC signal amplitude.

In the embodiment shown in FIG. 2, comparator 220, peak detector 230, controller 240, and DAC 250 control reference levels SYNC VREF and DATA VREF to ensure accurate extraction of auxiliary video data. Comparator 220 compares the video signal at node A with reference level PEAK VREF from DAC 250. The output of comparator 220, signal PEAK, exhibits logic 1 and logic 0 levels in response to levels of the video signal that exceed and are less than, respectively, reference level PEAK VREF. Controller 240 monitors signal PEAK via peak detector 230 and causes DAC 250 to vary the value of reference level PEAK VREF until signal PEAK accurately indicates that a peak value of the video signal has occurred.

Two peak values are of interest: the peak of the negative-going horizontal sync pulse and the peak of the RIC signal. The embodiment shown in FIG. 2 has two modes of operation, one for each of the peak values of interest. These modes of operation are designated sync mode and RIC mode. The value of reference level PEAK VREF that produces a valid indication of a signal PEAK during each mode are translated by controller 240 into control signal values for DAC 250. DAC 250 provides the desired sync threshold level for comparator 260 and the data slicing level for comparator 270 in response to the control signals from controller 240.

Sync mode is executed first to determine the peak value of the sync pulses. Controller 240 uses the sync peak value to determine the amplitude of the sync pulse and to establish a threshold level, SYNC VREF, that is related to the amplitude of the sync pulse in a known manner. For example, threshold level SYNC VREF may be set at 50% of the amplitude of the sync pulse. Signal SYNC at the output of comparator 260 will then provide an accurate indication of when the sync pulse, and the video line, begins. The beginning of the sync pulse, as indicated by signal SYNC, may then be used with the timing for the auxiliary video data (e.g. FIG. 1 for closed caption data) to accurately determine when the RIC signal and auxiliary video data will occur. This determination is made by controller 240.

After reference level SYNC VREF is established allowing the RIC signal to be accurately located, RIC mode is executed. The peak of the RIC signal is determined within a timing window established by controller 240 that encompasses the RIC signal burst. The positioning and duration of the window are based on the start of the sync pulse as indicated by signal SYNC and the timing of the auxiliary video data. Slicing level DATA VREF is established by controller 240 and DAC 250 based on the peak value of the RIC signal. For example, slicing level DATA VREF may be set equal to 50% of the amplitude of the RIC waveform.

The described operation of the embodiment in FIG. 2 involves using signal PEAK to enable a counter included within peak detector 230 when signal PEAK indicates that a peak value exists on signal VIDEO IN. For example, if signal PEAK at logic 1 indicates that signal VIDEO IN exceeds reference level PEAK VREF, then signal PEAK at logic 1 would enable the counter. A correct value of reference level PEAK VREF would cause signal PEAK to enable the counter for the duration of the pulse of interest, i.e. sync pulse or RIC signal pulses.

Count value CNT generated by the counter when enabled indicates the presence of a signal peak. The frequency of the clock signal used to clock the counter is selected to provide a plurality of clock pulses during the pulse period of interest. As an example, a clock rate of 128 times the horizontal rate (approximately 2 MHz) will provide 8 clock pulses during a horizontal sync pulse duration of approximately 4 us. If reference level PEAK VREF is set correctly enabling the counter for the duration of a sync pulse, a count of 8 should be obtained after one sync pulse. A low or 0 value of count value CNT indicates that a signal peak has not been detected. Thus, count value CNT will either be a low value representing no peak or a high value indicating a peak. If no peak is detected, the value of reference level PEAK VREF is adjusted by controller 240, the counter cleared, and the count test repeated until a peak is detected.

Variations in pulse characteristics may be accommodated in a number of ways. The narrower pulses of the RIC waveform in comparison to sync pulses (1 us versus 4 us) makes it desirable to use a higher clock rate for detecting the peaks of the RIC signal. A counter clock rate of 14 MHz, for example, for detecting RIC signal peaks rather than 2 MHz ensures that a plurality of clock pulses (approximately 14) will occur during each pulse of the RIC signal.

Alternatively, the count value may be accumulated over a plurality of pulses. In the case of sync pulses, controller 240 may permit signal PEAK to enable counting during a plurality of sync pulse intervals before evaluating count value CNT. In the case of a RIC signal, multiple cycles of the RIC signal occur during each occurrence of auxiliary video data. For example, the closed caption waveform shown in FIG. 1 includes 7 cycles of the RIC signal during each occurrence of line 21, field 1. Thus, controller 240 could permit signal PEAK to enable counting for as many as 7 pulses of the RIC signal during any line 21 interval. Accumulating the count value has the added advantage that variations between pulse amplitudes such as might be caused by noise may be effectively filtered out. The accumulation feature may be accomplished by controller 240 establishing a timing window during which the counter may be enabled by signal PEAK. The timing window would be active during the sync interval of several lines of video for sync peak detection and span several RIC signal pulses for RIC signal peak detection. For the RIC signal, the window positioning within any occurrence of line 21, field 1, would be based on the beginning of the sync pulse as indicated by signal SYNC. Thus, the window timing for RIC mode would be determined after sync mode has been completed. The value of reference level PEAK VREF would be constant throughout a window interval. If a peak is not detected after a window interval, the value of PEAK VREF is adjusted and the window repeated.

Figure 3A:
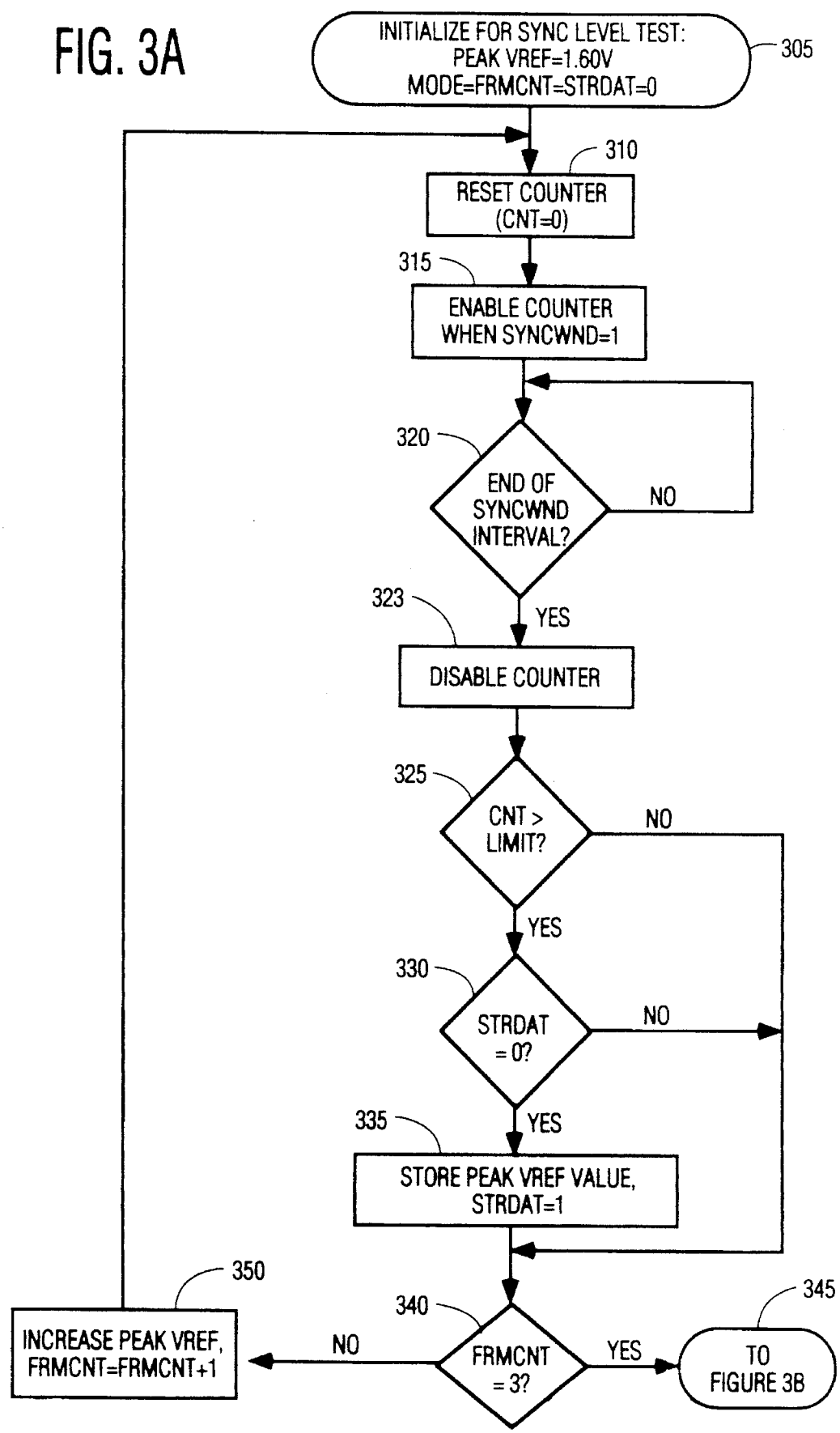
FIGS. 3A and 3B show flowcharts useful for understanding the operation of the system shown in FIG. 2.
Figure 3B:
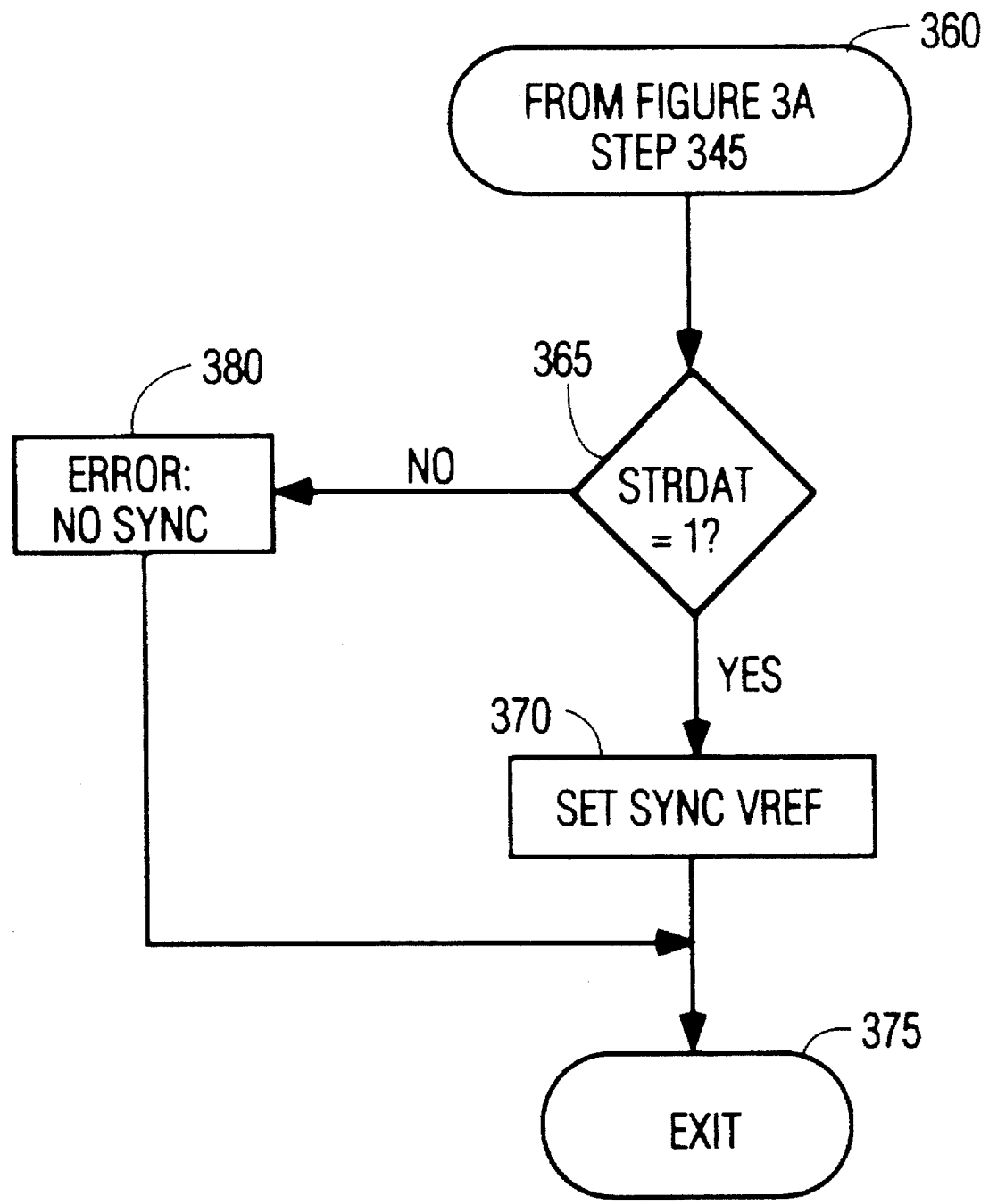

The described operation of the embodiment in FIG. 2 may be better understood by referring to the flowcharts shown in FIGS. 3A and 3B. In FIG. 3A, sync mode begins at step 305 with initialization of reference level PEAK VREF and variables MODE, FRMCNT, and STRDAT. Reference level PEAK VREF is initialized to a value that is not expected to produce a valid peak detection test initially. This ensures that subsequent adjustment of the value of PEAK VREF will indicate the level required to first produce a valid peak detection result. The value of PEAK VREF when a valid peak detection result is first produced is representative of the peak value of the sync pulse. The peak value is used to determine the amplitude of the sync pulse and to set the threshold (signal SYNC VREF) for comparator 260 in FIG. 2. This threshold may be, for example, 50% of the amplitude of the sync pulse as described above. Specific examples of values for reference level PEAK VREF and corresponding values of signal SYNC VREF are discussed below.

Variables MODE, FRMCNT, and STRDAT are initialized at step 310 as follows. Variable MODE may have a value of either 0 or 1 indicating sync mode and RIC mode, respectively, as the present mode of operation. Variable mode is set to 0 at step 310 because sync mode is executed first. Variable FRMCNT may have a value ranging from, for example, 0 to 3 indicating how many flames of the video signal have been used for the purpose of evaluating the peak value of the sync or RIC signal. The value of reference level PEAK VREF is varied during a succession of flames in each mode of operation to ensure detection of a peak value. Variable STRDAT may have a value of 0 or 1 representing whether a value of signal PEAK VREF (see FIG. 2) has not been stored or has been stored, respectively. A value of signal PEAK VREF is not stored until a valid peak is detected. Thus, the value of variable STRDAT indicates whether or not a valid peak has been detected.

At step 310 in FIG. 3A, the above-described counter within peak detector 220 (FIG. 2) is reset such that count value CNT is equal to 0. The counter is enabled for counting in response to signal PEAK when signal SYNCWND is at logic 1 (step 315). Signal SYNCWND is a window signal generated by controller 240 that is appropriate for the sync signal. As described above, the window signal may be active during each of a plurality of sync pulse intervals. Execution of the routine in FIG. 3A halts at step 320 until the window interval has ended as indicated by signal SYNCWND going to logic 0.

After the end of the window interval, the counter is disabled at step 323 and count value CNT is tested at step 325. If count value CNT exceeds a predetermined limit, a peak is detected. For example, in the case of sync pulses and the above described counter clock rate of 2 MHz producing 8 clock pulses during each sync pulse, a window interval active during 5 sync pulses may produce a count value of 40. Thus, a limit value of 32 at step 325 is a suitable threshold limit that would allow a margin of error of 8 (40–32) for pulses that may be missed at window edges. If a peak is detected at step 325, the value of variable STRDAT is tested at step 330. If STRDAT is equal to 0 (step 330), a value of PEAK VREF has not been stored previously and the present value of PEAK VREF will be stored. Note that variable STRDAT will always be zero during the first iteration (variable FRMCNT equals 0) of the routine in FIG. 3A. If STRDAT is equal to logic 1 at step 330, a peak was detected during a previous iteration of the routine in FIG. 3A and the corresponding value of PEAK VREF was stored at that time. As a result, storage of a new value of PEAK VREF is prevented by a jump to step 340 to bypass the store operation at step 330.

If the test of count value CNT at step 325 indicates that a peak has not been detected (count value CNT is less than the predetermined limit), execution after step 325 continues at step 340 bypassing both the test of variable STRDAT (step 330) and the store operation (step 335). At step 340, the value of variable FRMCNT is tested. The described illustrative sync mode operation comprises four iterations through the routine depicted in FIG. 3A. A different value of level PEAK VREF is used for each iteration. If variable FRMCNT is not equal to 3, the four iterations of the sync mode test are not complete. As a result, step 350 is executed to set the new value of reference level PEAK VREF for the next iteration and increment variable FRMCNT. Execution then continues at step 310 to begin the test for peak detection using the new value of level PEAK VREF.

If variable FRMCNT is equal to three indicating that the iterative peak detection part of the sync mode test is complete, the next step to be executed after step 340 of FIG. 3A is step 365 of FIG. 3B. At step 365, the value of variable STRDAT is tested. A value of 0 causes a "NO SYNC" error signal (not shown in FIG. 2) to be generated at step 380 because no valid sync peak was detected during sync mode. The system may respond to this error signal in various ways. For example, the system may disable auxiliary video data processing until a new program source or new channel is selected. Alternatively, the system may repeat the sync mode test after a delay.

If variable STRDAT is equal to 1 at step 365, a value of PEAK VREF has been stored indicating that a valid sync peak was detected. Controller 240 then proceeds at step 670 to cause DAC 250 to set the appropriate value of level SYNC VREF corresponding to the stored value of PEAK VREF. Illustrative values of variable FRMCNT and corresponding values of reference levels PEAK VREF and SYNC VREF that are appropriate for the above described sync mode operation are shown in Table 1.

TABLE 1

| MODE | FRMCNT | PEAK VREF | SYNC VREF |
| --- | --- | --- | --- |
| 0 | 0 | 1.60 V | 1.80 V |
| 0 | 1 | 1.76 | 1.88 |
| 0 | 2 | 1.84 | 1.92 |
| 0 | 3 | 1.92 | 1.96 |

The exemplary values provided in Table 1 are based on a black reference level (BLACK VREF in FIG. 2) of 2.00 V and a value of SYNC VREF that is 50% of the sync pulse peak value. The values of PEAK VREF in Table 1 are less than the black level because a sync pulse is negative-going with respect to the black level. As a result, the magnitude of the sync pulse is equal to the black level minus the value of PEAK VREF. The value of SYNC VREF is obtained by adding 50% of the magnitude of the sync pulse to the PEAK VREF value because the sync pulse is negative going. For example, if a valid peak detection occurs when variable FRMCNT equals 0, the peak of the sync pulse is at 1.6 V. The magnitude of the difference between the black level at 2.00 V and the value of PEAK VREF is 0.40 V which equals the amplitude of the sync pulse. Thus, the corresponding value for SYNC VREF is $$0.5*0.40 \text{ V} + 1.60 \text{ V} = 1.80 \text{ V}$$

as shown in Table 1. This is the computation performed at step 370 in FIG. 3B.

Other values for the black reference level or percentages other than 50% may be used requiring corresponding changes in the values in Table 1. In addition, a number of iterations other than 4 (a range of variable FRMCNT other than from 0 to 3) may be desirable with an associated different range of values of PEAK VREF and a different granularity of change in the value of PEAK VREF after each iteration. The values depicted in Table 1 have been found to produce satisfactory auxiliary video data extraction in conjunction with the approach described herein.

To simplify the routine depicted in FIG. 3A, four iterations of the routine involving enabling the counter (step 315), testing count value CNT (step 325), and modifying the value of reference level PEAK VREF are always executed regardless of which iteration results in detection of a sync pulse peak. The value of PEAK VREF that first causes detection of a sync peak is the only value of PEAK VREF that is stored. An alternative approach would be to stop looping after a valid peak is detected rather than continuing until a fixed number of iterations is completed.

A modification of sync mode operation may be desirable if the video system permits sync pulse amplitude to change abruptly. For example, changing video sources may cause the peak amplitude of the sync pulse to abruptly change to a value that is less than the present value of reference level SYNC VREF. As a result, signal SYNC will not be generated because the sync pulse amplitude will not exceed threshold level SYNC VREF at comparator 260 in FIG. 2. As described below, a window signal is generated during RIC mode with respect to signal SYNC. If signal SYNC is not generated, the window signal during RIC mode will not be generated causing the system to be unable to adjust the data slicing level during RIC mode with a resulting improper extraction of auxiliary video data.

The described situation may be addressed by having controller 240 monitor signal SYNC to detect a loss of signal. If signal SYNC ceases, controller 240 would immediately cause DAC 250 to set reference level SYNC VREF to the value closest to black level (1.96V in Table 1). This value of SYNC VREF would be held constant until sync mode is executed again to adjust level SYNC VREF. This procedure would ensure that signal SYNC would be generated if a video signal is present.

After sync mode operation has established a value of level SYNC VREF as described above, RIC mode is executed to set the slicing level. The routine depicted in FIGS. 3A and 3B is repeated during RIC mode with the following modifications. First, during RIC mode, variable MODE is equal to 1. Second, rather than window signal SYNCWND, the RIC window is indicated by signal RICWND. As discussed above, the RIC window is positioned in a particular line that may include auxiliary video data by delaying the window with respect to the beginning of sync in accordance with the specification for the auxiliary video data format (see e.g. FIG. 1 for closed caption data). Having established a value for sync pulse detection level SYNC VREF during sync mode makes it possible for controller 240 to accurately determine the beginning of the sync pulse in response to signal SYNC for the purpose of correctly positioning the RIC window. The duration of the RIC window may be selected to span a multiple number of RIC cycles, e.g. up to seven cycles for closed caption data, in any particular line containing auxiliary video data.

In addition to a different window signal, a different counter clock rate may be desirable for peak detection of the RIC signal. As described previously, examples of clock rates are approximately 2 MHz during sync mode and 14 MHz during RIC mode. A different clock rate might appear to make it necessary to use a different count limit at step 325 for each mode of operation. However, the window duration may be selected in each mode such that the window duration in combination with the clock rate and the different pulse peak durations (e.g. 4 us for a sync pulse and 1 us for a single RIC cycle pulse) permits using the same count limit in both sync and RIC mode. This permits using the same size counter in each mode, thereby simplifying the design and reducing hardware requirements.

One difference between sync mode and RIC mode operation using the routine in FIGS. 3A and 3B is that different values of PEAK VREF are required. While a sync pulse is a negative-going pulse with respect to black level requiring values of PEAK VREF less than black level, a RIC signal is positive-going with respect to black level requiring values of PEAK VREF greater than black level. In addition, the value of PEAK VREF is increased during each iteration of sync mode until a peak is detected because of the negative-going polarity of sync pulses. The positive-going nature of RIC pulses makes it necessary to reduce the value of PEAK VREF during each iteration until a peak is detected. Table 2 shows illustrative values for PEAK VREF and corresponding values for level DATA VREF (the slicing level).

TABLE 2

| MODE | FRMCNT | PEAK VREF | DATA VREF |
| --- | --- | --- | --- |
| 1 | 0 | 2.50 V | 2.25 V |
| 1 | 1 | 2.30 | 2.15 |
| 1 | 2 | 2.20 | 2.10 |
| 1 | 3 | 2.10 | 2.05 |

As in Table 1, the data in Table 2 is based on a black level of 2.00 V. However, for a positive-going RIC signal, the value of DATA VREF shown in Table 2 is equal to the black level plus 50% of the difference between the peak of the RIC signal (indicated by the stored value of PEAK VREF) and the black level. As was noted above in regard to sync mode and Table 1, values other than the reference levels shown in Table 2 and the 50% multiplier may be selected for use during RIC mode.

Another difference between operation during sync mode as shown in FIGS. 3A and 3B and during RIC mode is introduced by the possibility that the auxiliary video signal including the RIC signal may disappear during certain video program intervals. As an example, in the context of closed captioning, a video program including closed caption data may be interrupted by a commercial that is not closed captioned. In FIGS. 3A and 3B, the lack of a RIC signal during RIC mode would cause an error signal "NO RIC" to be generated at step 380 in FIG. 3B. However, the routine in FIG. 3B may be modified such that the last value of reference level DATA VREF prior to the loss of RIC signal is retained until the auxiliary video signal resumes. This approach has the advantage that an appropriate slicing level will exist when the auxiliary video data signal begins, allowing auxiliary data extraction to begin immediately.

In addition to the described condition where the RIC signal ceases, the RIC signal may also have a substantially D.C. value under certain input signal conditions. If the D.C. level equals or exceeds the slicing level (reference level DATA VREF) during the RIC window interval, the counter in peak detector 230 of FIG. 2 would be enabled continuously during the window interval rather than only during the intervals when the RIC waveform peaks exceed the slicing level. As a result, the counter might overflow exceeding the counter limit value that is tested at step 325 in FIG. 3A, causing an indication that a valid peak has been detected despite the lack of a RIC waveform. In addition, if the D.C. level is near the preferred slicing level for the auxiliary video data (e.g. average of the normal RIC amplitude), it may be desirable to have RIC mode set the slicing level at the D.C. value, not at 50% of the D.C. value as would normally occur with a detected peak amplitude value.

The described condition may be detected by expanding the test of count value CNT at step 325 in FIG. 3A to include a test for an extremely high, or overflow, value. This test may involve adding an additional bit the the counter to generate an overflow indication. Detection of an overflow condition could generate an interrupt to the system controller that might be handled in various ways such as causing a particular slicing level to be set.

Additional features of the described approach to auxiliary video data extraction will become apparent by referring to FIGS. 4, 6, and 7 which show exemplary embodiments of functions depicted in block diagram form in FIG. 2.

FIG. 4 shows an embodiment of peak detector 230. The function of peak detector 230 is to translate signal PEAK into a count value CNT that is monitored by controller 240 to determine when signal PEAK is correctly indicating a peak of the video signal. As shown in FIG. 4, peak detector 230 includes 6-bit counter 480. The output of counter 480, CNT5 through CNT0, corresponds to count value CNT that is shown connected to controller 240 in FIG. 2. Counter 480 increments count value CNT in response to signal CNTCLK. If the counter output exceeds a limit value, the desired peak has been detected. For example, if as described above, a count value of 32 is used as a limit value, controller 240 could determine that a peak has been detected by monitoring only signal CNT 5 (the MSB of the counter output).

Counter 480 is designed to prevent count value CNT from "wrapping around" to a count of 0 and continuing counting after reaching a maximum value of all logic 1's on signals CNT5 through CNT0. Instead, signal OVERFLOW is generated in response to an overflow condition (attempting to count beyond the maximum count value on signals CNT5 through CNT0) to serve as an error flag or interrupt signal as described above. Signal OVERFLOW may be generated by, for example, adding a seventh bit to counter 480 that toggles to a logic 1 state when signals CNT5 through CNT0 change from all logic 1's to all logic 0's. In addition to providing an error flag or interrupt, signal OVERFLOW going to a logic 1 state disables counter 480 to prevent continued counting.

Signal CNTCLK is generated by logically combining signals PEAK, WINDOW, and CLK as shown in FIG. 4. Signal MODE in FIG. 4 corresponds to variable MODE that was discussed above in regard to the flowchart shown in FIG. 3. Signal MODE in FIG. 4 controls MUX 440 to select which one of window signals SYNCWND or RICWND will be coupled to signal WINDOW. The purpose and form of the window signals (SYNCWND for sync mode and RICWND for RIC mode) were described previously. Signal MODE at logic 0 (sync mode) couples sync window signal SYNCWND to signal WINDOW while signal MODE at logic 1 (RIC mode) couples RIC window signal RICWND to signal WINDOW. Signals MODE, SYNCWND, and RICWND are generated by controller 240.

Signal CLK is produced at the output of MUX 450 in FIG. 4. As described above, a different rate clock signal may be used for counting during each mode of operation, e.g. 2 MHz and 14 MHz during sync and RIC modes, respectively. Signal MODE controls MUX 450 to determine which of the clock signals will be used. A logic 0 level on signal MODE (sync mode) causes MUX 450 to select signal SYNCCLK (2 MHz clock signal) as signal CLK, and signal MODE at logic 1 selects RICCLK (14 MHz clock).

Signal PEAK from comparator 220 in FIG. 2 is coupled to exclusive OR (XOR) gate 410 in FIG. 4. The other input of XOR 410 is coupled to the output of inverter 490 which provides an inverted version of signal MODE. The combination of inverter 490 and XOR 410 conditionally inverts signal PEAK in response to signal MODE. For example, when signal MODE is at logic 0 (sync mode), signal PEAKX at the output of XOR 410 is an inverted version of signal PEAK. Signal mode at logic 1 (RIC mode) does not cause an inversion of signal PEAK. The effect of the inversion is shown in the waveforms of FIG. 5 where, for illustrative purposes, signal MODE is at logic 0.

The conditional inversion ensures that signal PEAK has the same polarity regardless of the value of signal MODE. Without XOR 410, the polarity of signal PEAK for negative-going (with respect to black level) sync pulses would be inverted with respect to that for positive-going RIC pulses. For example, a sync waveform at the input to comparator 220 would cause signal PEAK to be normally at logic 1 and pulse to logic 0 in response to a negative-going sync pulse having a peak that is below the value of level PEAK VREF that is used during sync mode. During RIC mode, a RIC signal at the input of comparator 220 would cause signal PEAK to normally be at logic 0 and pulse to logic 1 in response to a positive-going RIC pulse having a peak above the value of PEAK VREF that is used during RIC mode. Including XOR 410 as shown in FIG. 4 causes signal PEAK to be normally at logic 0 in either mode and pulse to logic 1 in response either type of signal peak. A consistent polarity of signal PEAK during both modes eliminates duplication of logic to accommodate two different polarities.

The output of XOR 410 and signal WINDOW are gated together at AND gate 420 to produce signal D1 at the D input of D-type flip flop (DFF) 432. The output of DFF 432, signal Q1, is coupled to the D input of DFF 436. Signal CLK clocks both DFF 432 and 436. Signal Q1 is logically AND'ed with the output of DFF 432, signal Q2, at NAND gate 434. The combination of DFF 432, DFF 436, and NAND gate 434 comprises digital filter 430 that aids in eliminating noise pulses in signal PEAK, thereby improving peak detection reliability.

The operation of digital filter 430 may be better understood by referring to the timing diagram shown in FIG. 5. The brief duration pulse shown on signal PEAK (approximately aligned with pulse number 7 on signal CLK) represents a noise pulse that also appears on signal D1. However, the pulse is not clocked into DFF 432 or 436 because the brief duration of the pulse does not encompass a rising edge of signal CLK (the edge that clocks DFF 432 and 436). As a result, the pulse does not appear on either signal Q1 or signal Q2 and NAND gate 434 does not produce a corresponding pulse on signal FLTOUT at the output of digital filter 430. Thus, digital filter 430 eliminates the noise pulse.

Circuit 470 in FIG. 4 operates to modulate signal FLTOUT by signal CLK to generate signal CNTCLK. Signal CNTCLK is generated at the output of DFF 474 in circuit 470. DFF 474 is clocked by signal CLKN, an inverted version of signal CLK, that is produced at the output of inverter 460. Thus, DFF 474 is clocked on the falling edge of signal CLK while signal FLTOUT changes on the rising edge of signal CLK in response to the clocking of DFF 436 in digital filter 430. In addition to clocking counter 480, signal CNTCLK is fed back to the data input, signal D3, of DFF 474 via NOR gate 472 in circuit 470. A second input of NOR gate 472 is coupled to signal FLTOUT. The logical NOR of signals CNTCLK and FLTOUT coupled with the delaying action of DFF 474 in response to signal CLKN causes the modulation effect of circuit 470 that produces the CNTCLK waveform shown in FIG. 5. An alternative view of the operation of circuit 470 is that signal FLTOUT enables the clocking of counter 480.

FIG. 6 shows an embodiment of digital-to-analog converter (DAC) 250 in FIG. 2. The function of DAC 250 is to generate reference levels BLACK VREF, PEAK VREF, SYNC VREF, and DATA VREF in response to control signals from controller 240. As shown in FIG. 5, one resistive ladder configuration is used to provide all of the required reference voltages. The resistive ladder comprises a series connection of current source 630 and sixteen ladder resistors including resistor RA, fourteen "ratio" resistors, and resistor RB. Current source 630 causes a fixed current to flow through the resistor ladder, thereby generating the ladder voltages. The value of resistors RA and RB are selected to establish the voltages at the top and bottom of the ladder, respectively. These voltages are 2.50 V and 1.60 V in FIG. 6. The values of the ratio resistors are selected to provide the various ladder voltages intermediate the voltages at the top and bottom of the ladder. The various voltages provide the required reference voltages. The ratio resistors are shown in FIG. 6 as having values that are a multiple of a basic resistance value R.

The following example is provided to illustrate the selection of the values of RA, RB, and R. Assume that voltage VS in FIG. 6 is 5 V and that current source 630 is an ideal current source providing a constant current of 1 mA with no voltage drop across the current source. For these conditions, resistor RA would have a value of 2.5 kΩ to provide 2.50 V at the top of the ladder as shown in FIG. 6. Similarly, resistor RB would have a value of 1.6 kΩ to provide 1.60 V at the bottom of the ladder. The voltage drop across the fourteen ratio resistors is 0.9V (2.50 V–1.60 V) and the total resistance value of the ratio resistors in terms of the basic resistance value R is 18R. Thus, the value of R must be 50 Ω (0.9/18). The computation of actual resistor values would include consideration of non-ideal aspects of an actual current source, e.g. a transistor current source.

In the embodiment shown in FIG. 6, reference level BLACK VREF is fixed at 2.00 V. Various values may be selected for the other reference levels via the decoder and analog switch configuration shown in FIG. 6. For example, reference level PEAK VREF is produced at the output of a 1-of-8 analog switch comprising transmission gates 611 through 618. The specific value of reference level PEAK VREF is defined by the particular transmission gate that is enabled. Enabling of the transmission gates in the 1-of-8 analog switch is controlled by 1-of-8 decoder 620 in response to input control signals MODE, FRMCNT1, and FRMCNT0 from controller 240 of FIG. 2.

Control signals MODE, FRMCNT1, and FRMCNT0 select the value for reference level PEAK VREF according to the values in Tables 1 and 2 that were described above. Signals FRMCNT1 and FRMCNT0 are a digital representation corresponding to the values of variable FRMCNT that are listed in Tables 1 and 2. As an example, Table 1 shows that level PEAK VREF is 1.84V when variables MODE and FRMCNT are equal to 0 and 2, respectively. In FIG. 6, this condition corresponds to signals MODE and FRMCNT 0 being at logic 0 while signal FRMCNT 1 is at logic 1. These control signal values will cause 1-of-8 decoder 620 to enable transmission gate 616. As a result, the node of the resistor ladder that is at 1.84 V will be coupled to reference level PEAK VREF as specified in Table 1.

Similar arrangements of analog switches and decoders in FIG. 6 select the voltages from the resistor ladder that are needed for reference levels SYNC VREF and DATA VREF. A 1-of-4 analog switch comprising transmission gates 641–644 with 1-of-4 decoder 660 selects the voltage for reference level DATA VREF in response to control signals DATAVR1 and DATAVR0. A 1-of-4 analog switch comprising transmission gates 651–654 and 1-of-4 decoder 670 select the voltage for reference level SYNC VREF in response to control signals SYNCVR1 and SYNCVR0.

Control signals SYNCVR1, SYNCVR0, DATAVR1, and DATAVR0 are generated by controller 240 in FIG. 2 such that the decoders and analog switches in FIG. 6 will select voltage values for reference levels SYNC VREF and DATA VREF according to Tables 1 and 2. As an example, if the value of reference level PEAK VREF that produces a valid peak detection result (count value CNT exceeds the predetermined limit) during sync mode is 1.84 V, the corresponding value of reference level SYNC VREF is 1.92 V in Table 1. Controller 240 would set control signals SYNCVR1 and SYNCVR0 to logic levels 1 and 0, respectively, enabling transmission gate 452 in FIG. 6. As a result, the voltage of 1.92 V from the resistor ladder would be coupled via transmission gate 452 to reference level SYNC VREF as desired.

Controller 240 generates control signals SYNCVR1 and SYNCVR0 at step 370 of the routine shown in FIGS. 3A and 3B during sync mode. Control signals DATAVR1 and DATAVR0 are generated when step 370 is executed during RIC mode. The control signal values are stored, e.g. in registers, after being generated to ensure that reference levels SYNC VREF and DATA VREF will be held constant for subsequent extraction of auxiliary video data until the reference levels are set again by execution of sync and RIC modes. Continuous updating of the SYNC VREF and DATA VREF values may be achieved by continuously executing sync and RIC mode. This approach would update the reference levels every eight frames (four frames for sync mode and four frames for RIC mode). Continuous execution of sync and RIC modes would automatically correct for changing signal conditions such as signal "fadeouts". Alternatively, the control signal values may be held constant after being set by executing sync and RIC modes until a particular event occurs such as selection of a new video signal source.

Generating reference levels using a resistor ladder as shown in FIG. 6 is advantageous in several respects. First, the resistor ladder approach is well adapted to implementation in an integrated circuit. The use of a single resistor ladder to provide multiple reference voltages for detection of negative-going sync pulses and positive-going RIC pulses minimizes the area required on an integrated circuit. Also, the reference voltages provided by the resistor ladder are related to each other by resistor ratios, not specific resistor values. Thus, the relative relationship between the reference voltages will not be dependent on integrated circuit processing parameters. In addition, a standby low power mode may be provided by including a feature that disables current source 630 when low power consumption is desired.

Another feature of DAC 250 is a video signal range selection capability. The reference levels shown in Tables 1 and 2 assume a maximum video signal amplitude of 1V peak-to-peak. Video signals may exhibit signal amplitudes approaching 2V peak-to-peak. A 2V peak-to-peak video signal satisfying the NTSC sync-to-picture ratio of 40:100 includes a −40 IRE sync pulse amplitude corresponding to approximately 0.57V and a 50 IRE RIC signal amplitude corresponding to approximately 0.71V. For a black level of 2.00V, these amplitudes correspond to a sync pulse peak at 1.43V and RIC peak at 2.71V. Comparing these values to the voltages in Tables 1 and 2 indicates that the reference level values in Tables 1 and 2 are not adequate for a 2V peak-to-peak signal. More specifically, none of the values in Tables 1 and 2 would provide an initial reference level value for sync or RIC mode that fails to produce a valid peak detection indication as desired.

A range selection feature that permits DAC 250 to generate reference voltages suitable for both 1V and 2V peak-to-peak signals is provided by current source 680, resistor RC, and switches S1 and S2 in FIG. 6. The above described sample computation of resistor values for the resistor ladder assumed a 1 V peak-to-peak video signal with switches S1 and S2 open (non-conducting) as shown in FIG. 6. For a 2V peak-to-peak signal, signal RANGE causes switches S1 and S2 to close (conduct). Switch S1 closed causes the current flowing through the resistor ladder to double producing a greater range of reference voltages as desired. Switch S2 closed connects resistor RC in parallel with resistor RB, thereby decreasing the resistance at the bottom of the resistor ladder. The purpose of decreasing the bottom resistor is to maintain the black level at 2.00V.

An exemplary comparator embodiment that may be used to implement comparators 220, 260, and 270 is shown in FIG. 7. Current source 710 and transistors 720 through 750 are arranged in a differential amplifier configuration. Capacitor 760 is coupled between node A and signal VOUT to act as an analog filter. The filter effectively reduces the bandwidth of the amplifier, thereby reducing noise at the output of the comparator. If the described comparator design is used for comparator 220 of FIG. 2, the filtering provided by capacitor 760 operates in conjunction with digital filter 430 in FIG. 4 to substantially reduce noise in signal PEAK. Thus, significant filtering is provided without the need for a complex design for digital filter 430.

Although the invention has been described in the context of closed caption data, the invention may also be applicable to other forms of auxiliary video data, e.g. teletext. In the case of other forms of data, the system may require certain modifications. For example, the teletext standard permits teletext data to appear on a number of video lines, e.g. lines 17 to 20. Thus, for a teletext system, locating the auxiliary video data may require more than a line counter dedicated to detecting one specific line number.

The operation of the disclosed system may be modified in other ways to accommodate alternative auxiliary data formats. As an example, the counter clock rates may be changed to adapt to reference signals, e.g. the RIC signal, with different frequencies. Also, the window pulses may be modified in duration or position in accordance with other signal specifications. In addition, the number of iterations in the routine shown in FIGS. 3A and 3B and the reference levels used may be modified if the specification for the auxiliary video data changes.

Other modifications of the invention may also be evident to one skilled in the art. For example, controller 240 shown in FIG. 2 may be implemented using a microcomputer, hardwired logic, or with a combination of a microcomputer and hardwired logic. Thus, the functions included in the routine shown in FIGS. 3A and 3B may be implemented using various combinations of software and hardware approaches. Using a hardwired implementation permits continuous execution of the sync mode and RIC mode routines in the background to automatically provide continuous updating of the reference levels every eight frames without devoting microcomputer resources to this function.

These and other modifications are intended to be within the scope of the invention as defined by the following claims.

I claim:

1. Apparatus for processing a video signal including horizontal synchronizing pulses indicating the start of respective horizontal line intervals, and including an auxiliary information component occurring during at least one of said horizontal line intervals, said auxiliary information component including a reference component and a data component, said apparatus comprising:

a peak detector responsive to a threshold level for selectively detecting first and second peak amplitude levels of said video signal;

means for generating said threshold level such that said threshold level varies in a first range during a first interval including a portion of said horizontal synchronizing pulse to determine said first peak amplitude level corresponding to a peak amplitude of said horizontal synchronizing pulses, and varies in a second range during a second interval including a portion of said reference component of said auxiliary information component to determine said second peak amplitude level corresponding to a peak amplitude of said reference component, and for generating a second threshold level having a predetermined relationship to said second peak amplitude level; and means for comparing said video signal to said second threshold level to generate an output signal representative of said data component.

2. Apparatus according to claim 1 wherein said peak detector comprises a comparator for comparing said video signal to said threshold level to produce a control signal having a first state indicating that said video signal does not exceed said threshold level, and a second state indicating that said video signal does exceed said threshold level; and in that said threshold level generating means is responsive to said control signal for varying said threshold level during each of said first and second intervals from an initial value causing said control signal to be in said first state to a value causing said control signal to be in said second state.

3. Apparatus according to claim 2 wherein said threshold level generating means comprises a digital-to-analog converter.

4. Apparatus according to claim 2 wherein said peak detector comprises:

a source of a clock signal at a predetermined frequency;

a counter coupled to said clock signal source and responsive to said control signal for counting cycles of said clock signal to produce a count value when said control signal exhibits said second state during one of said first and second intervals; and said threshold level generating means being responsive to said count value for adjusting said threshold level in a direction to cause said counter to produce a desired count value.

5. Apparatus according to claim 4 wherein said second state of said control signal enables said counter to count during a plurality of said horizontal line intervals.

6. Apparatus according to claim 4 wherein said predetermined frequency is at a first frequency during said first interval and is at a second frequency during said second interval.

7. Apparatus according to claim 6 wherein said first and second frequencies are established to provide a plurality of cycles of said clock signal during a period when said control signal exhibits said second state and said threshold level exhibits a desired relationship to a respective one of said first and second peak amplitude characteristics.

8. Apparatus according to claim 4 wherein said count value produced during said second interval represents a counter overflow condition if said video signal does not include said reference component.

9. Apparatus according to claim 2 wherein said peak detector includes a filter for filtering said control signal.

10. Apparatus according to claim 2 wherein said comparator comprises:

a differential amplifier stage having first and second inputs coupled to receive said video signal and said threshold level, and having first and second outputs for providing respective first and second complementary output signals, one of said complementary output signals being representative of said control signal; and a filter coupled between said first and second complementary outputs.

11. Apparatus for processing a video signal having a synchronizing signal component and having an auxiliary information signal component comprising a reference signal and a data signal, said apparatus comprising:

first means responsive to a first threshold level for determining first and second amplitude characteristics of said video signal;

control means for generating a first value of said first threshold level during a first interval including a portion of said synchronizing signal component for enabling said first means to determine said first amplitude characteristic of said video signal, for generating a second value of said first threshold level during a second interval including a portion of said reference signal for enabling said first means to determine said second amplitude characteristic of said video signal, and for generating a second threshold level having a predetermined relationship to said amplitude characteristic of said reference signal; and a comparator for comparing said video signal to said second threshold level for generating data representative of said data signal.

12. Apparatus according to claim 11 wherein said first means produces a control signal having a first state indicating that said video signal does not exceed said first threshold level, and a second state indicating that said video signal does exceed said first threshold level;

said control means responds to said control signal for varying said first threshold level during each of said first and second intervals from a first value causing said control signal to be in said first state to a second value causing said control signal to be in said second state.

13. Apparatus according to claim 12 wherein said control means has a first mode of operation for providing said first and second threshold levels in response to said video signal exhibiting a first range of signal amplitudes; and said control means has a second mode of operation for providing said first and second threshold levels in response to said video signal exhibiting a second range of signal amplitudes.

14. Apparatus according to claim 13 wherein said control means comprises a digital to analog converter (DAC) responsive to a first value of a second control signal for providing said first and second threshold levels during said first mode of operation and being responsive to a second value of said second control signal for providing said first and second threshold levels during said second mode of operation.

15. Apparatus according to claim 12 wherein said first means comprises:

a counter responsive to a clock signal at a predetermined frequency and responsive to said control signal for counting cycles of said clock signal to produce a count value when said control signal exhibits said second state during one of said first and second intervals; and said control means being responsive to said count value for adjusting said first threshold level in a direction to cause said counter to produce a desired count value.

16. Apparatus according to claim 15 wherein said second state of said control signal enables said counter to count during a plurality of intervals such that said count value represents a total number of said cycles of said clock signal that occur during said plurality of intervals.

17. Apparatus according to claim 15 wherein said predetermined frequency is a first frequency during said first interval and is a second frequency during said second interval.

18. Apparatus according to claim 17 wherein
said first and second frequencies are established to provide a plurality of cycles of said clock signal during a period when said control signal exhibits said second state and said threshold level exhibits a desired relationship to a respective one of said first and second amplitude characteristics.

19. Apparatus according to claim 15 wherein said count value produced during said second interval represents a counter overflow condition if said video signal does not include said reference signal.

20. A method of determining a data slicing level for extracting data from an auxiliary information component of a video signal, said method comprising the steps of:

varying a threshold level of a peak detector in a first range for determining a peak amplitude of a synchronization signal component of said video signal;

setting a first threshold level at a value exhibiting a predetermined relationship to said peak amplitude of said synchronization signal component;

locating a reference signal portion of said auxiliary information component in response to said synchronization signal component exceeding said first threshold level;

varying said threshold level of said peak detector in a second range for determining a peak amplitude of said reference signal portion of said auxiliary information component; and setting said data slicing level at a value exhibiting a predetermined relationship to said peak amplitude of said reference signal.

\* \* \* \* \*